US012621505B2

(12) United States Patent
Zhou et al.

(10) Patent No.: US 12,621,505 B2
(45) Date of Patent: May 5, 2026

(54) METHOD, ELECTRIC DEVICE, AND COMPUTER-READABLE STORAGE MEDIUM FOR GENERATING LIVE STREAM PROMPT INFORMATION

(71) Applicant: Beijing Youzhuju Network Technology Co., Ltd., Beijing (CN)

(72) Inventors: Pei Zhou, Beijing (CN); Runfu Lin, Beijing (CN); Changcong Li, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 27 days.

(21) Appl. No.: 18/744,408

(22) Filed: Jun. 14, 2024

(65) Prior Publication Data

US 2024/0340468 A1 Oct. 10, 2024

Related U.S. Application Data

(63) Continuation of application No. PCT/CN2022/137872, filed on Dec. 9, 2022.

(30) Foreign Application Priority Data

Dec. 14, 2021 (CN) .......................... 202111532186.1

(51) Int. Cl.
*H04N 21/2187* (2011.01)
*H04N 21/431* (2011.01)
*H04N 21/488* (2011.01)

(52) U.S. Cl.
CPC ..... *H04N 21/2187* (2013.01); *H04N 21/4316* (2013.01); *H04N 21/4318* (2013.01); *H04N 21/4882* (2013.01)

(58) Field of Classification Search
None
See application file for complete search history.

(56) References Cited

U.S. PATENT DOCUMENTS

2013/0321388 A1 12/2013 Locke et al.
2017/0195737 A1 7/2017 Zhang
(Continued)

FOREIGN PATENT DOCUMENTS

CN 111372119 A 7/2020
CN 112104881 A 12/2020
(Continued)

OTHER PUBLICATIONS

China Patent Application No. 202111532186.1; Office Action; dated; Oct. 14, 2024; 17 pages.
(Continued)

*Primary Examiner* — James R Marandi
(74) *Attorney, Agent, or Firm* — BakerHostetler

(57) ABSTRACT

An information processing method and apparatus, an electronic device and a computer-readable storage medium are provided. The live stream information processing method includes: before a live stream starts, displaying at least one object to be introduced corresponding to a target live stream room and displaying an edit control corresponding to the at least one object to be broadcast; displaying an edit interface in response to a trigger operation for an edit control corresponding to one of the at least one object to be broadcast; and generating first explanation prompt information for the one of the at least one object to be broadcast through the edit interface.

19 Claims, 4 Drawing Sheets

(56)     References Cited

U.S. PATENT DOCUMENTS

2018/0152767 A1 *    5/2018 Liu ................... H04N 21/4781
2021/0014420 A1      1/2021 Song et al.

FOREIGN PATENT DOCUMENTS

| CN | 112162671 A | 1/2021 |
| CN | 112637630 A | 4/2021 |
| CN | 112738618 A | 4/2021 |
| CN | 112770135 A | 5/2021 |
| CN | 112995691 A | 6/2021 |
| CN | 113038152 A | 6/2021 |
| CN | 113286204 A | 8/2021 |
| CN | 113301362 A | 8/2021 |
| CN | 113378058 A | 9/2021 |
| CN | 113573129 A | 10/2021 |
| CN | 113596488 A | 11/2021 |

OTHER PUBLICATIONS

International Patent Application No. PCT/CN2022/137872; Int'l Search Report; dated Feb. 14, 2023; 3 pages.
Chinese Patent Application No. 202111532186.1; Notice of Allowance dated Jan. 13, 2025.

\* cited by examiner

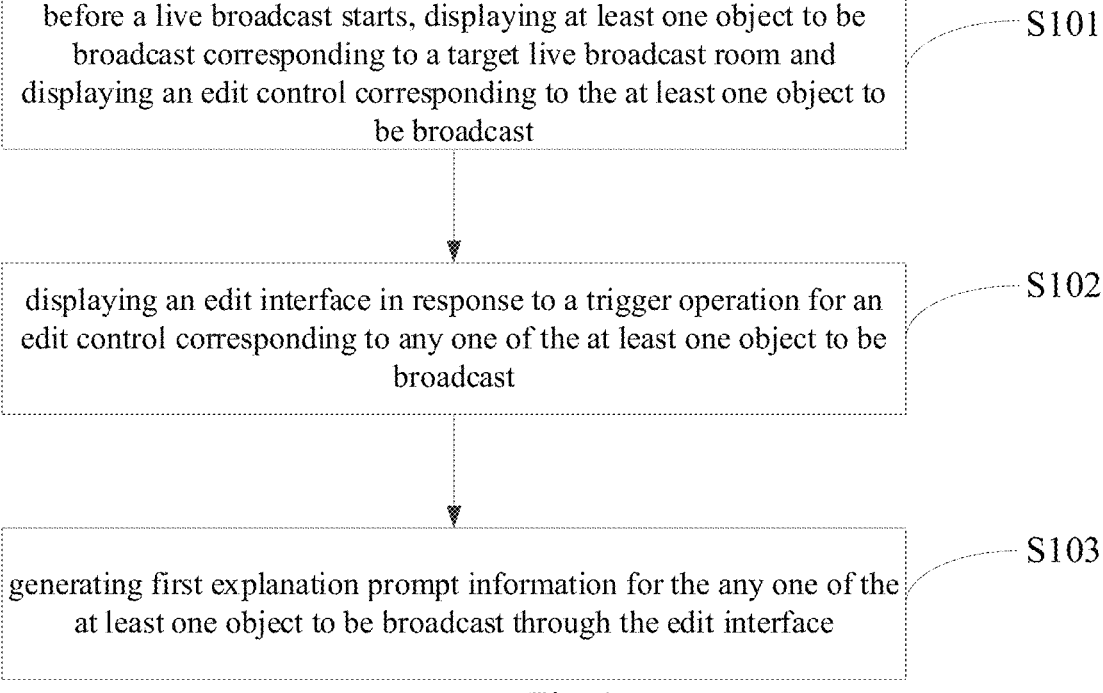

before a live broadcast starts, displaying at least one object to be broadcast corresponding to a target live broadcast room and displaying an edit control corresponding to the at least one object to be broadcast ⟶ S101 displaying an edit interface in response to a trigger operation for an edit control corresponding to any one of the at least one object to be broadcast ⟶ S102 generating first explanation prompt information for the any one of the at least one object to be broadcast through the edit interface ⟶ S103

Fig. 1

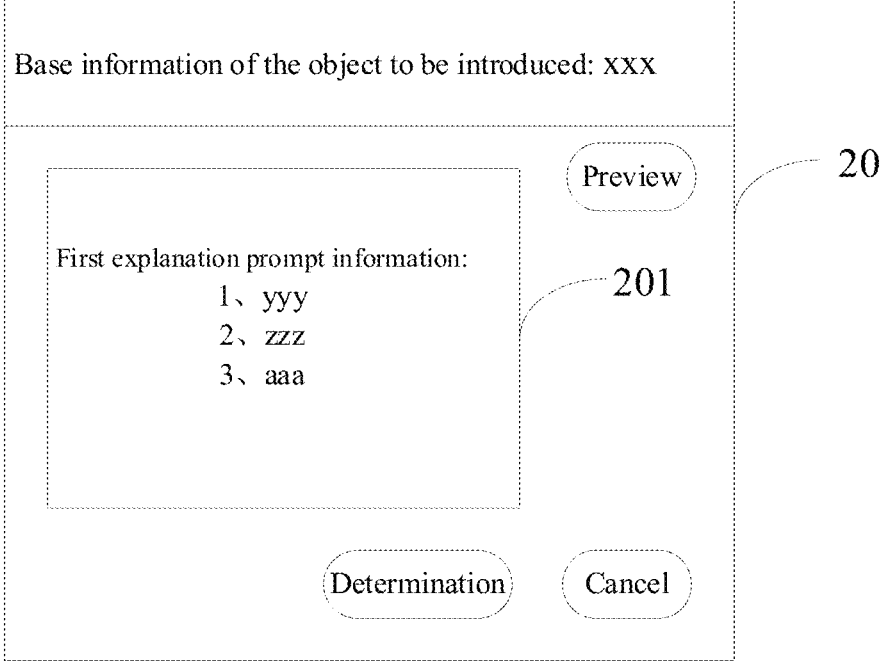

Base information of the object to be introduced: xxx

Preview ⟶ 20

First explanation prompt information:
1、 yyy
2、 zzz
3、 aaa
⟶ 201

Determination      Cancel

Fig. 2

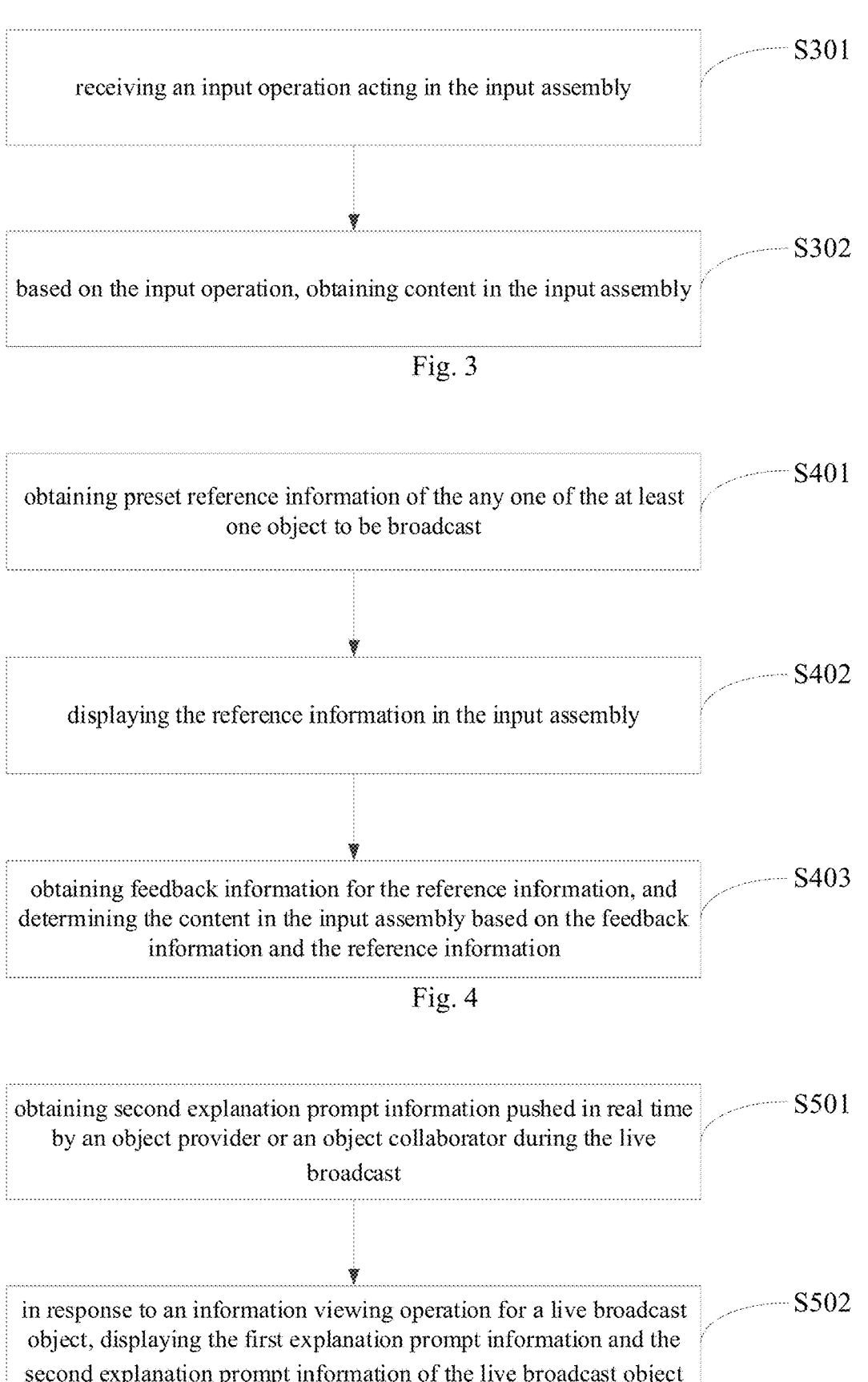

receiving an input operation acting in the input assembly — S301 based on the input operation, obtaining content in the input assembly — S302

Fig. 3 obtaining preset reference information of the any one of the at least one object to be broadcast — S401 displaying the reference information in the input assembly — S402 obtaining feedback information for the reference information, and determining the content in the input assembly based on the feedback information and the reference information — S403

Fig. 4 obtaining second explanation prompt information pushed in real time by an object provider or an object collaborator during the live broadcast — S501 in response to an information viewing operation for a live broadcast object, displaying the first explanation prompt information and the second explanation prompt information of the live broadcast object — S502

Fig. 5

Base information of the live broadcast object: xxx

Second explanation prompt information: bbb — 601

— 60

Open the word
prompt board

Basic information of the live broadcast object: xxx

Second explanation prompt information:
live broadcaster pays attention to
explaining the promotion activity First explanation prompt information:
1、 yyy
2、 zzz
3、 aaa

METHOD, ELECTRIC DEVICE, AND COMPUTER-READABLE STORAGE MEDIUM FOR GENERATING LIVE STREAM PROMPT INFORMATION

This application is a continuation of International Patent Application No. PCT/CN2022/137872, filed on Dec. 9, 2022, which claims the priority to and benefits of the Chinese Patent Application No. 202111532186.1, which was filed on Dec. 14, 2021. All the aforementioned patent applications are hereby incorporated by reference in their entireties.

TECHNICAL FIELD

The present disclosure relates to the field of Internet technology, for example, relates to a live stream information processing method and apparatus, a device and a storage medium.

BACKGROUND

With the continuous development of Internet technology, electronic commerce is gradually being combined with live stream. During the live stream, live streamers introduce items in the live stream, and viewers are able to watch the live stream at any time and purchase items in the live stream room.

In the related art, there is a need to prepare a large number of word prompt boards off-line, and in the live stream process, the word prompt boards are switched back and forth based on live stream items to realize word prompt for the live streamer through the prompt words on the word prompt board, however, the process is cumbersome to operate and prone to errors, and is less efficient, cannot meet user needs, and affects user experience.

SUMMARY

The present disclosure provides a live stream information processing method and apparatus, a device and a storage medium.

An embodiment of the present disclosure provides a live stream information processing method, including:

before a live stream starts, displaying at least one object to be broadcast (at least one object to be introduced in the live stream) corresponding to a target live stream room, and an edit control corresponding to the at least one object to be broadcast;

displaying an edit interface in response to a trigger operation for an edit control corresponding to any one of the at least one object to be broadcast; and generating first explanation prompt information for the any one of the at least one object to be broadcast through the edit interface.

An embodiment of the present disclosure further provides a live stream information processing apparatus, comprising:

a first display module, configured to display at least one object to be broadcast corresponding to a target live stream room, and display an edit control corresponding to the at least one object to be broadcast before the live stream starts;

a second display module, configured to display an edit interface in response to a trigger operation for an edit control corresponding to any one of the at least one object to be broadcast; and a generation module, configured to generate first explanation prompt information for the any one of the at least one object to be broadcast through the edit interface.

An embodiment of the present disclosure further provides an electronic device including a memory and a processor, the memory stores a computer program, and when the processor executes the computer program, the live stream information processing method provided by the embodiment of the present disclosure is implemented.

An embodiment of the present disclosure further provides a computer-readable storage medium storing a computer program, the computer program is executed by a processor, the method provided by the embodiment of the present disclosure is implemented.

BRIEF DESCRIPTION OF DRAWINGS

FIG. 1 is a flow diagram of a live stream information processing method provided by an embodiment of the present disclosure;

FIG. 2 is a schematic diagram of an edit interface provided by an embodiment of the present disclosure;

FIG. 3 is a flowchart illustrating obtaining content within an input component provided by an embodiment of the present disclosure;

FIG. 4 is a flowchart illustrating obtaining content within another input component provided by an embodiment of the present disclosure;

FIG. 5 is a flow diagram of another live stream information processing method provided by an embodiment of the present disclosure;

DETAILED DESCRIPTION

Figure 6:
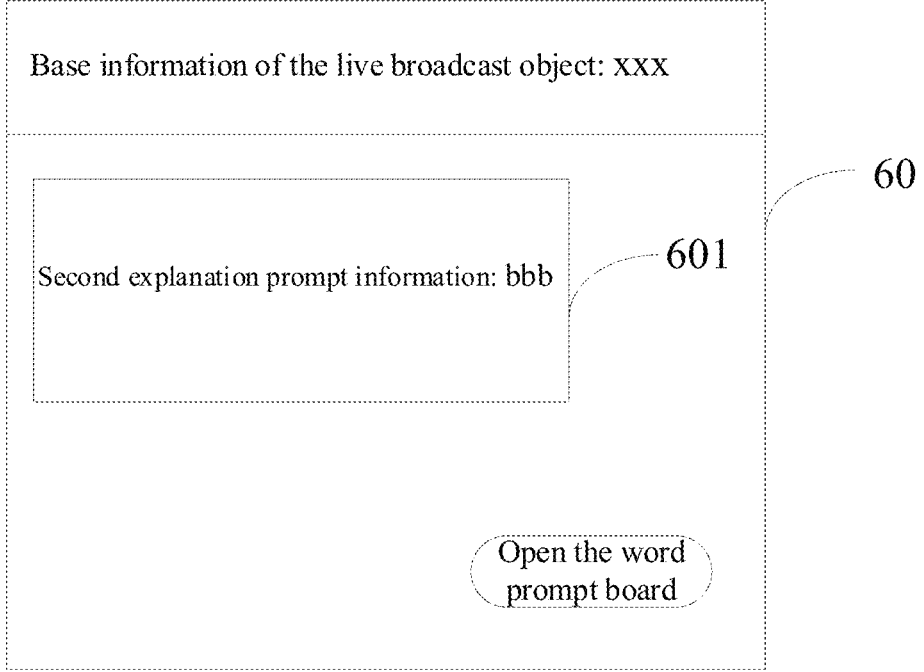
FIG. 6 shows a schematic diagram of an interface for setting second explanation prompt information provided by an embodiment of the present disclosure.

Embodiments of the present disclosure are described below with reference to the drawings. Although some embodiments of the present disclosure are shown in the drawings, the present disclosure may be achieved in many forms and should not be construed as being limited to the embodiments described here. On the contrary, these embodiments are provided to understand the present disclosure. The drawings and the embodiments of the present disclosure are only for exemplary purposes and are not intended to limit the scope of protection of the present disclosure.

The plurality of steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

Concepts such as "first" and "second" mentioned in the present disclosure are only used to distinguish different apparatuses, modules or units, and are not intended to limit orders or interdependence relationships of functions performed by these apparatuses, modules or units.

Modifications of "one" and "more" mentioned in the present disclosure are schematic rather than restrictive, and unless otherwise explicitly stated in the context, it should be understood as "one or more".

The names of messages or information interacted between a plurality of devices in the implementations of the present disclosure are only for illustrative purposes and are not intended to limit the scope of such messages or information.

The live stream information processing method provided by the embodiments of the present disclosure can be applied under a variety of scenes. For example, the live stream information processing method can be applied under a live inter-live shipment scene. Before the live stream, the user can directly set the first explanation prompt information of at least one object to be broadcast in the dimension of the object to be broadcast in the live stream room, and a close combination of the configuration of the explanation prompt information and the object to be broadcast in the live stream room is achieved. In this way, the live stream team does not need to prepare a large number of word prompt boards offline, nor does it need to purchase a special verbal software, thereby reducing manual input in the live stream, reducing the operation cost and error rate of manually switching word prompt boards, simplifying the operation of the user, and improving the user experience.

FIG. 1 is a flow diagram of a live stream information processing method provided by an embodiment of the present disclosure. As shown in FIG. 1, the method is applied in an electronic device, the method may include the following steps.

S101, before a live stream starts, displaying at least one object to be broadcast corresponding to a target live stream room and displaying an edit control corresponding to the at least one object to be broadcast.

Each object to be broadcast has a corresponding edit control, the corresponding edit control is configured to provide a portal for configuring the first explanation prompt information for the object to be broadcast.

The above-mentioned object to be broadcast refers to an object to be live stream in the target live room, and the above-mentioned object to be broadcast may be an object created in the live stream plan before the live stream, or may be a non-broadcast object that has been added to the live stream control. The above-mentioned object to be broadcast may be an object capable of being transacted, such as clothing, food, an ornament, a book and the like, and the object to be broadcast may include an object identification, a picture of the object, a transaction link to the object, or the like. Before the live stream, at least one object to be broadcast can be pre-configured with explanation prompt information for reference by the live streamer. For this reason, an edit control corresponding to at least one object may be displayed at the location of the at least one object to be broadcast, the edit control may be understood as a portal for configuring the explanation prompt information. That is, at least one of the objects to be broadcast in the live stream plan is in correspondence to a corresponding edit control, and the non-broadcast objects in the live stream control is in correspondence to a corresponding edit control, the user triggers a configuration operation for the explanation prompt information of the object to be broadcast by the edit control, and the configuration operation on the dimension of the object to be broadcast is realized.

S102, displaying an edit interface in response to a trigger operation for an edit control corresponding to any one of the at least one object to be broadcast.

The user triggers an edit control corresponding to any one of the objects to be broadcast to enter an edit interface, the user configures the first explanation prompt information for the objects to be broadcast at the edit interface, and the electronic device acquires the first explanation prompt information configured by the user through the edit interface.

S103, generating first explanation prompt information for the any one of the at least one object to be broadcast through the edit interface.

After the user completes editing of the corresponding content on the edit interface, the electronic device generates first explanation prompt information for any one of the at least one object to be broadcast based on the content edited by the user.

Optionally, as shown in FIG. 2, the edit interface 20 may include an input component 201, and the user configures the first explanation prompt information for the object to be broadcast through the input component 201. Optionally, the process of the above S103 may be: obtaining content in the input component; and in response to a confirmation operation for the content, generating the first explanation prompt information for the any one of the at least one object to be broadcast according to the content.

By editing the corresponding content in the input component and performing a confirmation operation on the content in the input component on the edit interface (for example, clicking the button "Save" or button "OK" on the edit interface), the electronic device obtains the content in the input component in response to the confirmation operation, and generates the first explanation prompt information of the object to be broadcast based on the content, thus completing the configuration of the explanation prompt information for the object to be broadcast. Optionally, the input component may be implemented in a form of an input frame.

Optionally, the edit interface may also present basic information for the object to be broadcast, such as an identification, a title, a picture, a selling price, a remaining inventory amount, a traded quantity, a tradable quantity of the object to be broadcast, and the like. The user can refer to the above-mentioned basic information to implement the configuration of the explanation prompt information for the object to be broadcast.

Optionally, the input component further supports setting of display parameters for the content. Based on this, on the basis of the above embodiment, optionally, the process of generating the first explanation prompt information for any one of the at least one object to be broadcast according to the content may be: obtaining a display parameter set for the content in the input component; and adjusting the content according to the display parameter, to present the first explanation prompt information according to the display parameter during the live stream.

The display parameter(s) may include at least one parameter associated with font. For example, font color, font size, bolding, slanting, underlining, and background color, and the like.

The user may set the display parameters of the content in the input component, such as setting the font color, font size of the content, highlighting or marking some more important information, etc., for the live streamer to focus on. In this way, the electronic device can obtain the set display parameters and adjust the content in the input component based on the display parameter, thereby presenting the first explanation prompt information according to the set display parameters during the live stream, achieving the need for a personalized presentation of the explanation prompt information.

In the present embodiment, modification of display parameters of the explanation prompt information, such as modification of parameters of font size, color and thickness of font, and the like, is supported, thereby improving the intelligence of configuration of the explanation prompt information, achieving the need for personalized presentation of the explanation prompt information, and improving the user experience.

The live stream information processing method provided by an embodiment of the present disclosure includes: before a live stream starts, displaying at least one object to be broadcast corresponding to a target live stream room and displaying an edit control corresponding to the at least one object to be broadcast; displaying an edit interface in response to a trigger operation for an edit control corresponding to any one of the at least one object to be broadcast; and generating first explanation prompt information for the any one of the at least one object to be broadcast through the edit interface. That is, through the edit control corresponding to the object to be broadcast, the first explanation prompt information of the object to be broadcast in the live room can be set in advance on the dimension of the object to be broadcast, without the need to prepare a large number of word prompt boards offline, the manual input in the live stream process is reduced, the operation cost of manually switching the word prompt boards is reduced, and the user experience is improved.

In one embodiment, the input component supports the user to manually input a configuration content, optionally, as shown in FIG. 3, the above-mentioned process of obtaining the content in the input component may be implemented as the following steps.

S301, receiving an input operation acting in the input component.

S302, based on the input operation, obtaining content in the input component.

The input operation may adopt a plurality of modes such as voice input, text input, and one-key import, and the like, and in the case where the input operation is a voice input mode, the electronic device may convert the voice input by the user into corresponding text information and display the text information in the input component, and the user may check the correctness of the converted text information. The input component further supports a one-key import function, that is, the electronic device receives a document input through the one-key import function and acquires text information from the document. For example, a user may save a pre-edited text in a document, import the document into the electronic device by triggering a one-key import control in the input component, and the electronic device extracts the text information from the document and displays the text information in the input component, so that the user can check the correctness of the displayed content. The format of the above-mentioned document may be any format.

In this way, the electronic device may acquire the content input by the user into the input component based on the received input operation. The electronic device may generate the first explanation prompt information of the object to be broadcast based on the content input by the user in the input component. In actual practice, the input component, in addition to supporting the user to manually input the first explanation prompt information of the object to be broadcast, also supports recommending the reference information to the user in the case where the user does not input the configuration content. On the basis of the above embodiment, optionally, as shown in FIG. 4, the process of the above-mentioned obtaining the content in the input component may be implemented as the following steps.

S401, obtaining preset reference information of the any one of the at least one object to be broadcast.

S402, displaying the reference information in the input component;

S403, obtaining feedback information for the reference information, and determining the content in the input component based on the feedback information and the reference information.

The electronic device may obtain preset reference information of the object to be broadcast in the case where the input operation acting in the input component is not received within a preset time. The reference information is explanation prompt information recommended by the electronic device for the object to be broadcast. For example, the explanation prompt information of a target object with a higher similarity to the object to be broadcast is obtained, and the obtained explanation prompt information is determined as the reference information of the object to be broadcast. The electronic device displays the reference information in the input component for the user to decide whether to adopt the reference information. If the user finds that the reference information matches the object to be broadcast in a high degree, the reference information can be used directly without being modified, and thus the user triggers a confirmation operation on the reference information, the electronic device obtains the confirmation feedback information from the user, and the reference information can be determined as the content of the input component.

If the user finds that the reference information remains to be modified, the user can modify the reference information, the electronic device determines target information based on the modified content produced by the user and the unmodified reference information, and determines the target information as the content in the input component.

In one embodiment, the process of the above-mentioned S401 may be: extracting identification information of the any one of the at least one object to be broadcast; sending a request message to a service terminal, in which the identification information is included in the request message; and receiving the reference information of the any one of the at least one object to be broadcast determined by the service terminal based on the identification information.

The above-mentioned identification information may be a name, a main image, a type or characteristic information of the object to be broadcast, or the like. Taking the case that the identification information is the feature information as an example, the electronic device may input the image of the object to be cast to a pre-trained model, and the feature information of the object to be cast is extracted by the pre-trained model. The characteristic information of the object to be broadcast may also be extracted in other ways. After obtaining the characteristic information of the object to be broadcast, the electronic device transmits the characteristic information to the service terminal carrying the characteristic information in a request message, and the service terminal determines the reference information matching the characteristic of the object to be broadcast in combination with the characteristic information. For example, a target object having a high degree of similarity with the characteristic information is determined, and the explanation prompt information of the target object is determined as the reference information of the object to be broadcast.

In this embodiment, the display of the reference information of the object to be broadcast in the input component in the case where the user does not input the configuration content is supported, which can provide a reference basis for the user to configure the first explanation prompt information, enrich the content of the first explanation prompt information, reduce the operation cost of the user, improve the intelligence of the configuration of the first explanation prompt information, and improve the user experience.

In one embodiment, the correctness of the content in the input component may also be detected. On the basis of the above embodiment, optionally, the above-mentioned generating the first explanation prompt information of the any one of the at least one object to be broadcast according to the content may comprise the following steps.

detecting the content.

If the detection passes, the first explanation prompt information of any one of the at least one object to be broadcast is generated according to the content.

If the detection fails, the modification suggestion information is determined and the modification suggestion information is displayed for modifying the content according to the modification suggestion information.

Exemplarily, the correctness of the content in the input component is detected by calling the corresponding detection interface, and if the detection does not pass, it cannot be saved, and the modification suggestion information is determined and displayed for indicating modifying the content in the input component according to the modification suggestion information. At the same time, the modified content is obtained, and the detection operation is performed again on the modified content until the detection of the content in the input component passes. If the detection passes, the first explanation prompt information of the object to be broadcast may be generated based directly on the content.

In this embodiment, the content in the input component can be automatically detected, ensuring the correctness of the content and improving the user experience.

A preview function for the first explanation prompt information is also supported after the first explanation prompt information of the object to be broadcast is configured. On the basis of the above embodiment, optionally, the method may further include: in response to a trigger operation of a preview control corresponding to the any one of the at least one object to be broadcast, displaying a preview window; and displaying the first explanation prompt information of the any one of the at least one object to be broadcast through the preview window.

The preview control may be disposed within the edit interface (as shown in FIG. 2), or may be disposed in other locations, and the present embodiment is not limited in this respect. If the user needs to preview the first explanation prompt information of the object to be broadcast, the user may perform a trigger operation on the preview control, and in response to the trigger operation on the preview control, the electronic device creates a new preview window, and the first explanation prompt information of the object to be broadcast is displayed through the preview window.

In one embodiment, after the preview, if the user wants to modify the first explanation prompt information, the user may modify the configured first explanation prompt information again through the edit control corresponding to the object to be broadcast. The electronic device displays an edit interface in response to a trigger operation for an edit control corresponding to the object to be broadcast; if the first explanation prompt information has been configured for the object to be broadcast, the configured first explanation prompt information is displayed in the input component in the edit interface, the user modifies the configured first explanation prompt information and confirms the modification operation, the electronic device obtains the modified content in the input component, and regenerates the first explanation prompt information of the object to be broadcast based on the modified content.

In the present embodiment, the preview of the configured first explanation prompt information of the object to be broadcast is supported, which can satisfy the preview requirements of other users, such as the live streamer, for the first explanation prompt information of the object to be broadcast before the live stream; and modification of the configured explanation prompt information is also supported, i.e., more functionality can be provided, which can meet the user's need for more functionality, and improve the user experience.

After the live start, at the position of at least one object to be broadcast in the live stream control, status information for indicating whether the object to be broadcast is configured with the first explanation prompt information is displayed. The status information may include configured with first explanation prompt information and non-configured with first explanation prompt information. The user can learn the configuration of at least one object to be broadcast with respect to the first explanation prompt information by the status information. During the live stream, a portal for opening the first explanation prompt information of the live stream object is also provided, e.g. a corresponding module is provided, and a corresponding control is provided in the module for viewing the first explanation prompt information of the live stream object. The live stream object is an object that is currently live stream. Meanwhile, if the live stream object has been previously configured with the first explanation prompt information, the electronic device may also display basic information of the live stream object, such as a main image and a name of the live stream object, through the above-mentioned module. If the live stream object is not previously configured with the first explanation prompt information, the electronic device may also display a prompt such as "the object with no explanation prompt information currently" through the above-mentioned module.

In one embodiment, after the live stream starts, the live streamer may also be pushed with second explanation prompt information in real time. For example, a virtual resource, such as red packets, is set in the target live stream, and the live streamer needs to be reminded of the distribution of the red packet. To this end, on the basis of the above embodiment, optionally, as shown in FIG. 5, the method may further include the following steps.

S501, obtaining second explanation prompt information pushed in real time by an object provider or an object collaborator during the live stream.

The second explanation prompt information is information except the first explanation prompt information for reference by the live streamer. During the live stream, the object provider (e.g., the live stream terminal) may input in real time some reminder information that requires the attention of the live streamer, based on the current live stream situation, such as reminder information reminding the live streamer to explain the coupon of the live stream object (the object introduced in the live stream). Referring to FIG. 6, the live control interface may be provided with a corresponding module 60, the corresponding module 60 is provided with an input portal 601 for the second explanation prompt information, the user can input the second explanation prompt information through the input portal 601, and the electronic device obtains the second explanation prompt information pushed in real time by the live stream terminal. In some cases, the electronic device may also obtain the second explanation prompt information pushed in real time by the object collaborator (e.g., the service terminal), for example, the service terminal actively triggers the corresponding second explanation prompt information based on the promotion strategy set by the service terminal based on the target live stream room. For example, the user sets up a virtual resource (e.g., red packets) in the target live stream room, the service terminal may trigger the corresponding second explanation prompt information to remind the live streamer to explain the distribution situation of the red packets.

S502, in response to an information viewing operation for a live stream object, displaying the first explanation prompt information and the second explanation prompt information of the live stream object.

The live stream object is one of the at least one object to be broadcast. The user may trigger the information viewing operation of the live stream object by a corresponding voice operation or touch operation, for example, by performing a trigger operation on a display control corresponding to the live stream object, the display control may be understood as a display portal for information to be referred to by the live streamer (e.g., the button "Open Word Prompt Board" in FIG. 6), the user may perform a trigger operation on the display control, in response to the trigger operation on the display control, the electronic device enters the information viewing interface. The first explanation prompt information of the live stream object and the second explanation prompt information pushed in real time by the other device for reference by the live streamer are displayed through the information viewing interface.

Figure 7:
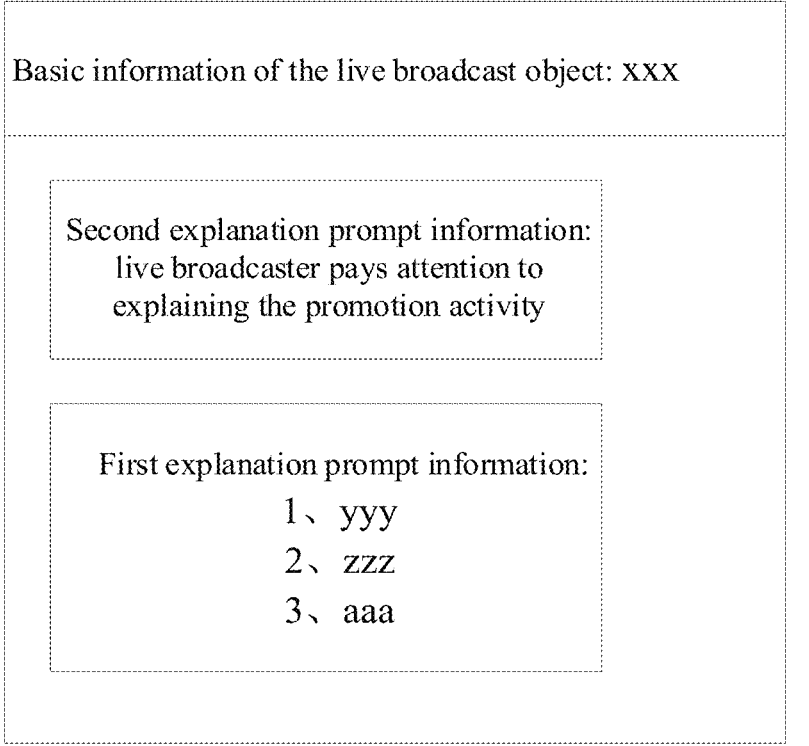
FIG. 7 is a schematic diagram illustrating a presentation of explanation prompt information for a live stream object provided by an embodiment of the present disclosure.

Referring to the information viewing interface shown in FIG. 7, the information viewing interface may include basis information of the current live stream object, such as the main image of the object, the title of the object, the selling price, the available inventory, and the traded quantity. At the same time, the information viewing interface may also include the second explanation prompt information pushed in real time by the other device and the first explanation prompt information of the live stream object. In this way, by performing the trigger operation on the display control, the information viewing interface can be opened, and the live streamer can give an explanation with reference to the information displayed by the information viewing interface, and the function of configuring the explanation prompt information and presenting the explanation prompt information in the same one software is realized, and no additional device is added, thereby the live stream operation is reduced, and the user experience is improved.

In one embodiment, after obtaining the new second explanation prompt information, the information viewing interface may also be updated to replace the second explanation prompt information displayed in the information viewing interface with the new second explanation prompt information.

Because the live stream situation may change from time to time in the target live stream room, after the change, the user may input new second explanation prompt information or the service terminal may push new second explanation prompt information for reference by the live streamer. Then, after obtaining the new second explanation prompt information, the electronic device may also update the information viewing interface to replace the second explanation prompt information displayed in the information viewing interface with the new second explanation prompt information. For example, the second explanation prompt information "live streamer pays attention to explaining the promotion activity" shown in FIG. 7 is replaced with "live streamer pays attention to the distribution situation of red packets".

In this embodiment, the electronic device can receive the second explanation prompt information pushed in real time by other devices, and display the first explanation prompt information and the second explanation prompt information of the live stream object through the information viewing interface; after obtaining the new second explanation prompt information, the electronic device can also replace the second explanation prompt information displayed in the information viewing interface with the new second explanation prompt information, enabling real-time updating of the information, which can satisfy the text requirements in the live stream process, better assist the live streamer to introduce the live stream object, and improve the user experience.

In one embodiment, the above-mentioned live stream object may include an object that has been configured with the first explanation prompt information before the live stream or an object that is not configured with the first explanation prompt information before the live stream. In the case where the above-mentioned live stream object is an object that has been configured with the first explanation prompt information before the live stream, the electronic device displays the previously configured first explanation prompt information through the information viewing interface. In the case where the above-mentioned live stream object is an object that is not configured with the first explanation prompt information, the above-mentioned S502 may be replaced by the following steps.

S5031, obtaining recommended explanation prompt information of the live stream object.

The recommended explanation prompt information refers to the explanation prompt information recommended to the user about the live stream object. The electronic device may determine the recommended explanation prompt information of the live stream object based on the extracted characteristic information by extracting the characteristic information of the live stream object; it is also possible to determine a target object with a higher similarity to the live stream object, obtain target explanation prompt information of the target object, and determine the obtained target explanation prompt information as the recommended explanation prompt information of the live stream object.

S5032, displaying the recommended explanation prompt information and the second explanation prompt information.

That is, for the live stream object that is not configured with the first explanation prompt information before the live stream, the display function of the first explanation prompt information may also be provided to the user in response to the trigger operation for the display control during the live stream.

In this embodiment, for the live stream object that is not configured with the first explanation prompt information before the live stream, during the live stream, the recommended explanation prompt information can be intelligently provided in combination with the characteristics of the live stream object, the text requirements during the live stream process can be satisfied, the live streamer can be better assisted to introduce the live stream object, the manual input in the live stream process can be reduced, and the user experience can be improved.

In an embodiment of the present disclosure, the word prompt editing may be performed at an edit interface (word prompt edit interface) before the live stream is started, and in response to editing confirmation, the word prompt corresponding to the object to be broadcast is generated. In response to the trigger operation of starting the live stream, the target presentation interface is entered, the generated word prompt is acquired during the live stream, and the live stream window and the word prompt information presentation area (word prompt card) are presented in the target presentation interface (live stream recording interface). The live window and the word prompt information presentation area (word prompt card) are simultaneously presented on the interface of the live streamer terminal, the live window shows a real-time screen of the live streamer and live interactive information, and the word prompt card shows the first explanation prompt information and/or the second explanation prompt information for the live streamer to explain the object to be broadcast with reference to the explanation prompt information during the live stream. In response to the switching of the live stream object (e.g., at the end of the explanation of the first live stream object, it is switched to the second live stream object to explain), the explanation information of the word prompt information presentation area is switched from the corresponding first explanation prompt information and/or the second explanation prompt information of the first live stream object to the corresponding first explanation prompt information and/or the second explanation prompt information of the second live stream object. Thus, in the present disclosure, the live window and the verbal information presentation area (word prompt card) can be simultaneously presented at the same one interface, which facilitates the live streamer to quickly view the explanation prompt information and the live interaction information during the live stream, does not require complicated operation and switching by the live streamer, and is beneficial to improving the experience of the live streamer.

In addition, it is also possible to hide or expand the presentation of the word prompt card in response to a user's trigger, or to adjust the presentation position and the presentation size of the word prompt card in response to a user's trigger, thereby facilitating flexible switching operated by the live streamer, to more conform to the live streamer's viewing habits, and improving live stream efficiency and live stream experience.

Figure 8:
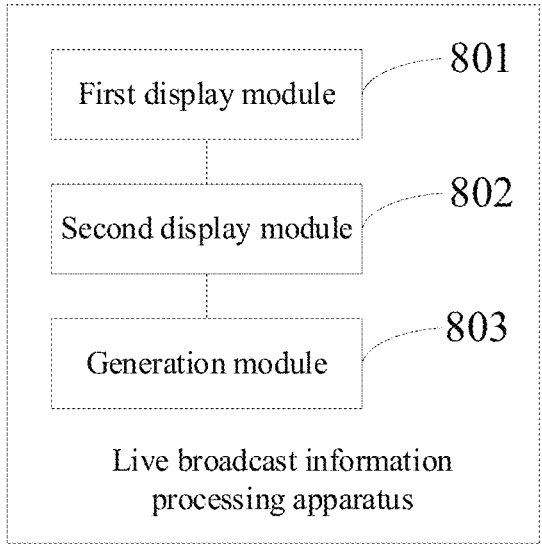
FIG. 8 is a structural diagram of a live stream information processing apparatus provided by an embodiment of the present disclosure.

FIG. 8 is a structural diagram of a live stream information processing apparatus provided by an embodiment of the present disclosure. As shown in FIG. 8, the apparatus may include: a first display module 801, a second display module 802, and a generation module 803.

The first display module 801 is configured to display at least one object to be broadcast corresponding to the target live stream and display an edit control corresponding to the at least one object to be broadcast before the live stream starts;

the second display module 802 is configured to display an edit interface in response to a trigger operation for an edit control corresponding to any one of the at least one object to be broadcast;

the generation module 803 is configured to generate, through the edit interface, explanation prompt information for the any one of the at least one object to be broadcast.

The live stream information processing apparatus provided by an embodiment of the present disclosure involves: before a live stream starts, displaying at least one object to be broadcast corresponding to a target live stream room and displaying an edit control corresponding to the at least one object to be broadcast; displaying an edit interface in response to a trigger operation for an edit control corresponding to any one of the at least one object to be broadcast; and generating first explanation prompt information for the any one of the at least one object to be broadcast through the edit interface. That is, through the edit control corresponding to the object to be broadcast, the first explanation prompt information of the object to be broadcast in the live room can be set in advance on the dimension of the object to be broadcast, without the need to prepare a large number of word prompt boards offline, the manual input in the live stream process is reduced, the operation cost of manually switching the word prompt boards is reduced, and the user experience is improved.

On the basis of the above embodiment, optionally, an input component is included in the edit interface;

the generation module 803 may include: an obtaining unit and a generation unit.

The obtaining unit is configured to obtain the content in the input component;

the generation unit is configured to generate the explanation prompt information for the any one of the at least one object to be broadcast according to the content, in response to a confirmation operation for the content.

On the basis of the above embodiment, optionally, the obtaining unit is specifically configured to receive an input operation acting in the input component; based on the input operation, obtaining content in the input component.

On the basis of the above embodiment, optionally, the obtaining unit may include an obtaining subunit, a displaying subunit and a determining subunit.

The obtaining subunit is configured to obtain preset reference information of the any one of the at least one object to be broadcast;

the display subunit is configured to display the reference information in the input component;

the determining subunit is configured to obtain feedback information for the reference information and determining the content in the input component based on the feedback information and the reference information.

On the basis of the above embodiment, optionally, the obtaining subunit is specifically configured to extract identification information of the any one of the at least one object to be broadcast, send a request message to a service terminal, in which the identification information is included in the request message, and receive the reference information of the any one of the at least one object to be broadcast determined by the service terminal based on the identification information.

On the basis of the above embodiment, optionally, the above generation unit is specifically configured to obtain a display parameter set for the content in the input component, and adjust the content according to the display parameter, to present the first explanation prompt information according to the display parameter during the live stream.

On the basis of the above embodiment, optionally, the apparatus further includes: a third display module and a fourth display module.

Specifically, the third display module is configured to display a preview window in response to a trigger operation for a preview control corresponding to the any one of the at least one object to be broadcast;

the fourth display module is configured to display the first explanation prompt information of the any one of the at least one object to be broadcast through the preview window.

On the basis of the above embodiment, optionally, the apparatus further comprises: an obtaining module and a fifth display module.

The obtaining module is configured to obtain the second explanation prompt information pushed in real time by the object provider or the object collaborator in the live stream process;

the fifth display module is configured to display the first explanation prompt information and the second explanation prompt information of a live stream object, in response to an information viewing operation for the live stream object, and the live stream object is one of the at least one object to be broadcast.

Figure 9:
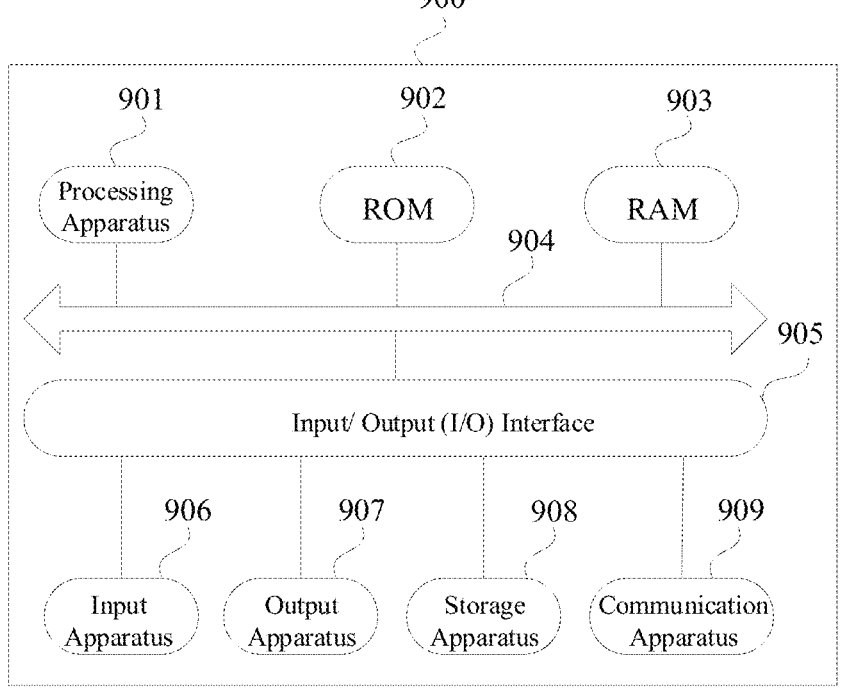
FIG. 9 is a structural schematic diagram of an electronic device provided by an embodiment of the present disclosure.

Referring to FIG. 9 in the following, FIG. 9 illustrates a schematic structural diagram of an electronic device 900 suitable for implementing embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable multimedia player (PMP), a vehicle-mounted terminal (e.g., a vehicle-mounted navigation terminal) or the like, and fixed terminals such as a digital television (TV), a desktop computer, or the like. The electronic device illustrated in FIG. 9 is merely an example, and should not pose any limitation to the functions and the range of use of the embodiments of the present disclosure.

As illustrated in FIG. 9, the electronic device 900 may include a processing apparatus 901 (e.g., a central processing unit, a graphics processing unit, etc.), the processing apparatus 901 can perform a plurality of suitable actions and processing according to a program stored in a read-only memory (ROM) 902 or a program loaded from a storage apparatus 908 into a random-access memory (RAM) 903. The RAM 903 further stores a plurality of programs and data required for operations of the electronic device 900. The processing apparatus 901, the ROM 902, and the RAM 903 are interconnected by means of a bus 904. An input/output (I/O) interface 909 is also connected to the bus 904.

The following apparatus may be connected to the I/O interface 905: an input apparatus 906 including, for example, a touch screen, a touch pad, a keyboard, a mouse, a camera, a microphone, an accelerometer, a gyroscope, or the like; an output apparatus 907 including, for example, a liquid crystal display (LCD), a loudspeaker, a vibrator, or the like; a storage apparatus 908 including, for example, a magnetic tape, a hard disk, or the like; and a communication apparatus 909. The communication apparatus 909 may allow the electronic device 900 to be in wireless or wired communication with other devices to exchange data. While FIG. 9 illustrates the electronic device 900 having various apparatuses, not all of the illustrated apparatuses are necessarily implemented or included. More or fewer apparatuses may be implemented or included alternatively.

According to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 909 and installed, or may be installed from the storage apparatus 908, or may be installed from the ROM 902. When the computer program is executed by the processing apparatus 901, the above-mentioned functions defined in the methods of some embodiments of the present disclosure are performed.

The above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. The computer-readable storage medium may include but not be limited to: an electrical connection with one or more wires, a portable computer disk, a hard disk, a random-access memory RAM, a read-only memory ROM, an erasable programmable read-only memory (EPROM), or flash memory, an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them. The storage medium may be a non-transitory storage medium.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The computer-readable medium carries one or more programs that, when executed by the electronic device, cause the electronic device to:

before a live stream starts, displaying at least one object to be broadcast corresponding to a target live stream room and displaying an edit control corresponding to the at least one object to be broadcast;

displaying an edit interface in response to a trigger operation for an edit control corresponding to one of the at least one object to be broadcast; and generating first explanation prompt information for the one of the at least one object to be broadcast through the edit interface.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to a plurality of embodiments of the present disclosure. In this regard, each block in the flowcharts or block diagrams may represent a module, a program segment, or a portion of codes, including one or more executable instructions for implementing specified logical functions. In some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. Each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The units involved in the embodiments of the present disclosure may be implemented in software or hardware. Among them, the name of the unit does not constitute a limitation of the unit itself under a circumstance. For example, the first obtaining unit may also be described as "a unit that obtains at least two Internet protocol addresses".

The functions described herein above may be performed, at least partially, by one or more hardware logic components. For example, without limitation, available exemplary types of hardware logic components include: a field programmable gate array (FPGA), an application specific integrated circuit (ASIC), an application specific standard parts (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. Machine-readable storage medium include electrical connection with one or more wires, portable computer disk, hard disk, random-access memory (RAM), read-only memory (ROM), erasable programmable read-only memory EPROM, or flash memory, optical fiber, portable compact disk read-only memory (CD-ROM), optical storage device, magnetic storage device, or any suitable combination of the foregoing.

In an embodiment, an electronic device is further provided which includes a memory and a processor, the memory stores a computer program, and when the processor executes the computer program, the following steps are implemented:

before a live stream starts, displaying at least one object to be broadcast corresponding to a target live stream room and displaying an edit control corresponding to the at least one object to be broadcast;

displaying an edit interface in response to a trigger operation for an edit control corresponding to any one of the at least one object to be broadcast; and generating first explanation prompt information for the any one of the at least one object to be broadcast through the edit interface.

In an embodiment, a computer-readable storage medium is further provided, a computer program is stored in computer-readable storage medium, when the computer program is executed by a processor, the following steps are implemented:

before a live stream starts, displaying at least one object to be broadcast corresponding to a target live stream room and displaying an edit control corresponding to the at least one object to be broadcast;

displaying an edit interface in response to a trigger operation for an edit control corresponding to any one of the at least one object to be broadcast; and generating first explanation prompt information for the any one of the at least one object to be broadcast through the edit interface.

The live stream information processing apparatus, the device and the storage medium provided in the above embodiments can perform the live stream information processing method provided by any embodiment of the present disclosure, with corresponding function modules and effects of performing the method. Technical details, which are not described in detail in the above embodiments, can be referred to the live stream information processing method provided by any embodiment of the present disclosure.

According to one or more embodiments of the present disclosure, a live stream information processing method is provided which includes:

before a live stream starts, displaying at least one object to be broadcast corresponding to a target live stream room and displaying an edit control corresponding to the at least one object to be broadcast;

displaying an edit interface in response to a trigger operation for an edit control corresponding to any one of the at least one object to be broadcast; and generating first explanation prompt information for the any one of the at least one object to be broadcast through the edit interface.

According to one or more embodiments of the present disclosure, the live stream information processing method as above is provided which further includes:

an input component being included in the edit interface;

obtaining content in the input component; and in response to a confirmation operation for the content, generating the first explanation prompt information for the any one of the at least one object to be broadcast according to the content.

According to one or more embodiments of the present disclosure, the live stream information processing method as above is provided which further includes: receiving an input operation acting in the input component; and based on the input operation, obtaining content in the input component.

According to one or more embodiments of the present disclosure, the live stream information processing method as above is provided which further includes: obtaining preset reference information of the any one of the at least one object to be broadcast; displaying the reference information in the input component; and obtaining feedback information for the reference information, and determining the content in the input component based on the feedback information and the reference information.

According to one or more embodiments of the present disclosure, the live stream information processing method as above is provided which further includes: extracting identification information of the any one of the at least one object to be broadcast; sending a request message to a service terminal, in which the identification information is included in the request message; and receiving the reference information of the any one of the at least one object to be broadcast determined by the service terminal based on the identification information.

According to one or more embodiments of the present disclosure, the live stream information processing method as above is provided which further includes: obtaining a display parameter set for the content in the input component, to present the first explanation prompt information according to the display parameter during the live stream.

According to one or more embodiments of the present disclosure, the live stream information processing method as above is provided, which further includes: in response to a trigger operation of the preview control corresponding for the any to-be-cast object, displaying a preview window; and displaying first explanation prompt information for the any one of the at least one object to be broadcast through the preview window.

According to one or more embodiments of the present disclosure, the live stream information processing method as above is provided which further includes: obtaining second explanation prompt information pushed in real time by an object provider or an object collaborator during the live stream; and in response to an information viewing operation for a live stream object, displaying the first explanation prompt information and the second explanation prompt information of the live stream object.

In addition, while a plurality of operations have been described in a particular order, it shall not be construed as requiring that such operations are performed in the stated specific order or sequence. Under certain circumstances, multitasking and parallel processing may be advantageous. Similarly, while a plurality of implementation details are included in the above discussions, these shall not be construed as limitations to the present disclosure. Some features described in the context of a separate embodiment may also be combined in a single embodiment. Rather, a plurality of features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims.

The invention claimed is:

1. An information processing method, comprising:

before a live stream starts, displaying at least one object to be introduced during the live stream;

displaying an edit control before the live stream starts, wherein the edit control corresponds to the at least one object to be introduced during the live stream;

displaying an edit interface before the live stream starts in response to detecting a trigger operation for the edit control;

generating first prompt information before the live stream starts based on user input received via the edit interface, wherein the first prompt information comprises information associated with the at least one object to be introduced during the live stream; and displaying the first prompt information in a first presentation area of a screen and displaying the live stream in a second presentation area of the screen during the live stream.

2. The method according to claim 1, wherein an input component is included in the edit interface;

the generating first prompt information comprises:

obtaining content in the input component; and generating the first prompt information according to the content in response to a confirmation operation for the content.

3. The method according to claim 2, wherein the obtaining content in the input component comprises:

receiving an input operation acting in the input component; and obtaining content in the input component based on the input operation.

4. The method according to claim 3, wherein the generating the first prompt information according to the content comprises:

obtaining a display parameter set for the content in the input component; and adjusting the content according to the display parameter, to present the first prompt information according to the display parameter during the live stream.

5. The method according to claim 3, further comprising:

displaying a preview window in response to a trigger operation for a preview control corresponding to the one of the at least one object to be introduced; and displaying first prompt information for the one of the at least one object to be introduced through the preview window.

6. The method according to claim 3, further comprising:

obtaining second prompt information pushed in real time by an object provider or an object collaborator during the live stream; and displaying the first prompt information and the second prompt information of a live stream object in response to an information viewing operation for the live stream object, wherein the live stream object is one of the at least one object to be introduced.

7. The method according to claim 2, wherein the obtaining content in the input component comprises:

obtaining preset reference information of the one of the at least one object to be introduced;

displaying the reference information in the input component; and obtaining feedback information for the reference information, and determining the content in the input component based on the feedback information and the reference information.

8. The method according to claim 7, wherein the obtaining preset reference information of the one of the at least one object to be introduced comprises:

extracting identification information of the one of the at least one object to be introduced;

sending a request message to a service terminal, wherein the identification information is included in the request message; and receiving the reference information of the one of the at least one object to be introduced determined by the service terminal based on the identification information.

9. The method according to claim 7, wherein the generating the first prompt information according to the content comprises:

obtaining a display parameter set for the content in the input component; and adjusting the content according to the display parameter, to present the first prompt information according to the display parameter during the live stream.

10. The method according to claim 7, further comprising:

displaying a preview window in response to a trigger operation for a preview control corresponding to the one of the at least one object to be introduced; and displaying first prompt information for the one of the at least one object to be introduced through the preview window.

11. The method according to claim 2, wherein the generating the first prompt information comprises:

obtaining a display parameter set for the content in the input component; and adjusting the content according to the display parameter, to present the first prompt information according to the display parameter during the live stream.

12. The method according to claim 2, further comprising:

displaying a preview window in response to a trigger operation for a preview control corresponding to the one of the at least one object to be introduced; and displaying the first prompt information through the preview window.

13. The method according to claim 2, further comprising:

obtaining second prompt information pushed in real time by an object provider or an object collaborator during the live stream; and displaying the first prompt information and the second prompt information of a live stream object in response to an information viewing operation for the live stream object, wherein the live stream object is one of the at least one object to be introduced.

14. The method according to claim 1, further comprising:

obtaining second prompt information pushed in real time by an object provider or an object collaborator during the live stream; and displaying the first prompt information and the second prompt information of a live stream object in response to an information viewing operation for the live stream object, wherein the live stream object is one of the at least one object to be introduced.

15. The method according to claim 14, wherein in response to a trigger operation of starting the live stream, a target presentation interface is entered, a generated word prompt is acquired during the live stream, a live stream window and a word prompt information presentation area are simultaneously presented in the target presentation interface, and the first prompt information and the second prompt information of the live stream object are displayed in the word prompt information presentation area;

in response to switching a first live stream object into a second live stream object, explanation information of the word prompt information presentation area is switched from the first prompt information and/or the second prompt information of the first live stream object into the first prompt information and/or the second prompt information of the second live stream object.

16. The method according to claim 15, wherein presentation of the word prompt information presentation area is hidden or expanded in response to a user's trigger.

17. The method according to claim 15, wherein a presentation position and a presentation size of the word prompt information presentation area are adjusted in response to a user's trigger.

18. An electronic device comprising a memory and a processor, the memory storing a computer program, wherein the computer program, upon being executed by the processor, causes the processor to implement operations comprising:

before a live stream starts, displaying at least one object to be introduced during the live stream;

displaying an edit control before the live stream starts, wherein the edit control corresponds to the at least one object to be introduced during the live stream;

displaying an edit interface before the live stream starts in response to detecting a trigger operation for the edit control;

generating first prompt information before the live stream starts based on user input received via the edit interface, wherein the first prompt information comprises information associated with the at least one object to be introduced during the live stream; and displaying the first prompt information in a first presentation area of a screen and displaying the live stream in a second presentation area of the screen during the live stream.

19. A non-transitory computer-readable storage medium, with a computer program that is stored therein, wherein the computer program, upon being executed by a processor, causes the processor to implement operations comprising:

before a live stream starts, displaying at least one object to be introduced during the live stream;

displaying an edit control before the live stream starts, wherein the edit control corresponds to the at least one object to be introduced during the live stream;

displaying an edit interface before the live stream starts in response to detecting a trigger operation for the edit control;

generating first prompt information before the live stream starts based on user input received via the edit interface, wherein the first prompt information comprises information associated with the at least one object to be introduced during the live stream; and displaying the first prompt information in a first presentation area of a screen and displaying the live stream in a second presentation area of the screen during the live stream.

* * * * *